Jan. 24, 1939.  K. E. PLANTS  2,144,772
GARMENT HANGER SUPPORT
Filed Sept. 30, 1936
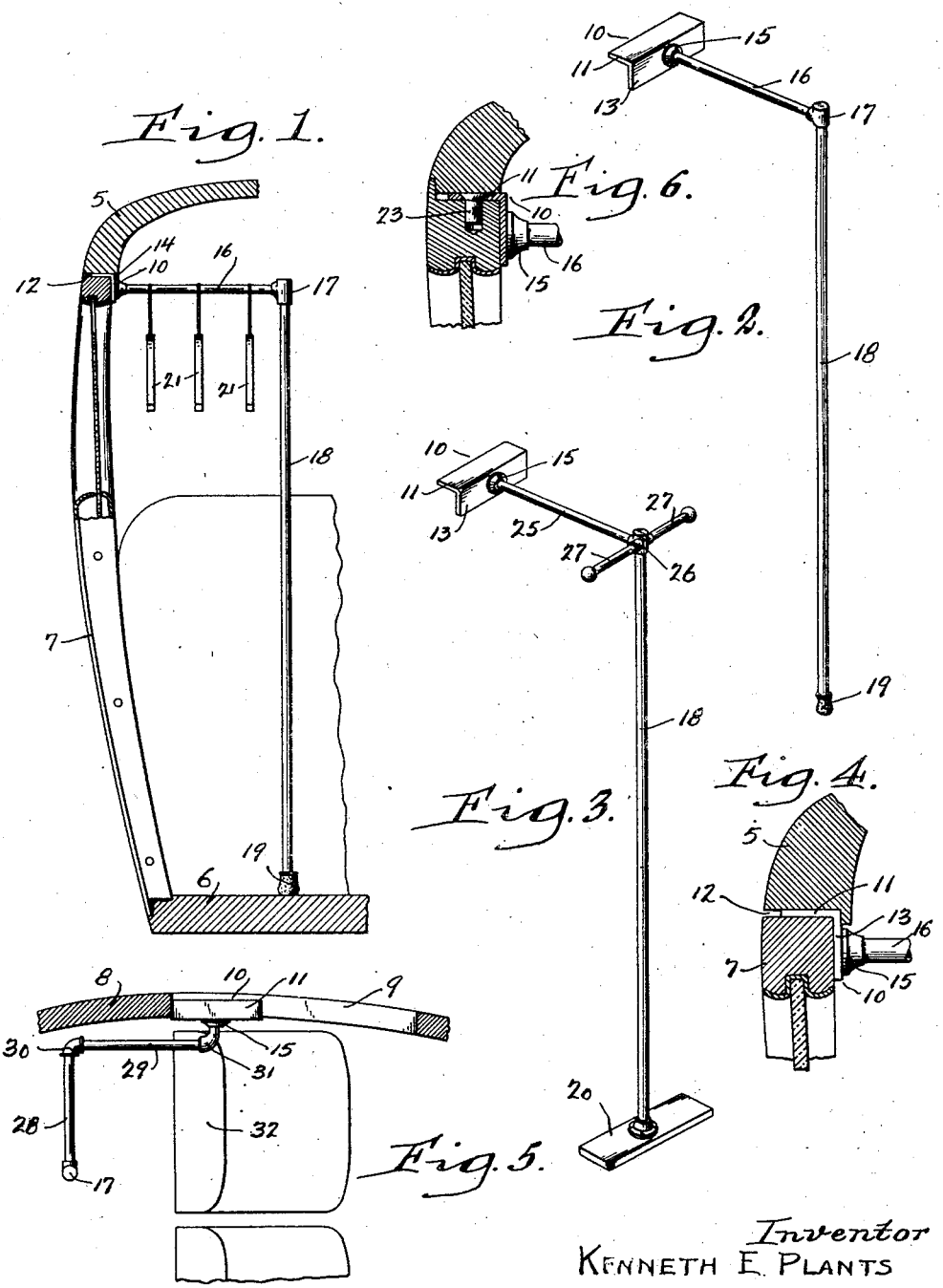
Inventor
KENNETH E. PLANTS
by J. W. McEllis
Attorney Patented Jan. 24, 1939

2,144,772

UNITED STATES PATENT OFFICE 2,144,772

GARMENT HANGER SUPPORT

Kenneth E. Plants, Hornell, N. Y.

Application September 30, 1936, Serial No. 103,373

1 Claim. (Cl. 224—29)

My invention relates in general to garment hanger supports and in particular to such a support for use in vehicles.

It is well known to those skilled in the art that it is many times desired to carry clothing in automobiles without having to pack the same in traveling bags, not only because of the time required and the inconvenience in doing so, but also because of the fact that such packing causes creasing or wrinkling of the clothing.

The principal object of my invention has, therefore, been to provide a hanger support for attachment to the inside of a vehicle, by which clothes may be suspended and carried upon suitable hangers.

Another object has been to provide a device of this character which may be made collapsible and easily attached to or detached from the vehicle.

Furthermore, my invention is of such a nature that it is rigidly held in position while in use without having to be permanently attached to the vehicle to which it is applied and without having to alter the same.

The above objects and advantages have been accomplished by the device shown in the accompanying drawing, of which:

Fig. 1 is a fragmentary, transverse, sectional elevation of an automobile, showing my device attached thereto.

Fig. 2 is a perspective view of my complete device.

Fig. 3 is a perspective view of a modified form of device.

Fig. 4 is an enlarged, fragmentary view showing more clearly the way of attaching the form of my invention which is shown in Fig. 1 to the vehicle.

Fig. 5 is a fragmentary, plan view of an automobile showing my invention applied to a two-door vehicle.

Fig. 6 is an enlarged, fragmentary, sectional view of modified means for attaching my device.

In the drawing, 5 represents the top of the vehicle, 6 the floor, and 7 a door thereof. My device is particularly applicable to four-door sedans, but may also be used on two-door coupes or coaches, as shown in Fig. 5, where 8 represents the section of the body taken therethrough at the top of the door, and 9 the door thereof.

It is well known to those skilled in the art that between the top edge of the door and the upper surface bounding the door opening, there is a slight space, and I utilize this space in attaching my device to the vehicle. As shown in the form of Figs. 1, 2, 4, and 6, where the device is applicable to four-door sedans, I provide a relatively thin attaching angle 10 which has its horizontal leg 11 disposed in the space 12 between the lower face of the door and the upper surface of the frame bounding the door opening. The vertical leg 13 of the angle extends down and in contact with the inner face of the door. In most cars there is a door jamb 14 carried by the door frame at the top of the door opening. This door jamb is located on the inside of the door frame and, usually, there is a small space provided between it and the door when closed. My attaching angle 10 is so positioned that this door jamb contacts with the outer face of the angle leg 13 at the upper edge thereof and serves to securely hold the attaching angle in place between the door and the door jamb. By this engagement, when the angle is placed in the door opening against the jamb, and the door is closed, the angle will be securely held in position, and in such manner that it may be easily removed when desired. Such attachment does not require that any work be done upon the vehicle.

The leg 13 of the angle is preferably provided with a boss 15 which may be screwthreaded for the reception of a hanger rod 16. This rod may be of any suitable length, depending upon the number of hangers to be supported thereby. At the inner end thereof there is preferably arranged an elbow fitting 17 having its other opening extending downwardly. A vertical support 18 has its upper end secured to the fitting 17 and extends downwardly to the floor 6 of the vehicle. The bottom end of this vertical support may have a foot 19 of rubber or other suitable material. Instead of the foot 19, the vertical support may have a foot 20 in the form of a strip of wood or other material which rests upon the floor.

As shown in Fig. 1, hangers 21 are supported from the hanger rod 16. Obviously, the attaching angle is secured between the door and the door jamb in such position that it will not interfere with the driver.

In Fig. 3, I show another form of invention which is particularly useful when compactness is desired. In this form an extension rod 25 is shown as being secured to the attaching angle 10. The outer end of this extension rod is secured to a cross-fitting 26 to which may be releasably secured two hanger rods 27 which are arranged preferably at right angles to the extension rod. Obviously, either one or both of these rods may be used, as desired. A vertical support 18 is also provided in this form of invention, which is also secured to the cross-fitting 26.

In those vehicles which are not provided with a door jamb, such as 14, the form of invention of Fig. 6 may be used. In the form of invention here shown, the leg 11 of the attaching angle is provided with one or more dowel pins 23 which engage with one or more registering openings formed either in the top surface of the door or the under surface of the door frame. Such pin or pins will keep the attaching angle in place within the space above the door when the door is closed.

Where my invention is to be applied to a two-door coupe or coach, shown in Fig. 5, the hanger rod 28 is offset in relation to the attaching angle 10 by means of an extension rod 29 which is secured at one end to an elbow fitting 30, to which elbow fitting the hanger rod 28 is attached. At the other end of the extension rod there is provided an elbow fitting 31, one end thereof being secured to the boss 15 of the attaching angle and the other end receiving the forward end of the extension rod 29. By this means, the hanger rod 28 is spaced a sufficient distance back from the front seat 32 so as to properly support the garments without interference with the front seat.

While I have shown my invention as made up of fittings in the nature of tubes or pipes, secured together by means of pipe fittings, it is obvious that the hanger rod or rods and the vertical member may be made in one piece with suitable bends at the points where the elbow fitting 17 and cross-fitting 26 are located and the free end of the hanger supporting rod may also be attached to the attaching angle by welding or other suitable means.

Obviously, the vertical support 18, as well as the hanger rod 16 and extension rod 25, may be made adjustable in any suitable manner, such as telescoping of the parts or making the unions between the parts initially slidable and lockingly engageable by means of suitable set screws.

These and other modifications of the details herein shown and described may be made without departing from the spirit of my invention or the scope of the appended claim, and I do not, therefore, wish to be limited to the exact embodiment herein shown and described, the forms shown being merely preferred embodiments thereof.

Having thus described my invention, what I claim is:

The combination with an automobile body having an outwardly swinging door, mounted on vertically arranged pivots in a door frame formed by the body, and a door jamb carried by the frame for cooperation with the top of the door, of a portable, rigidly mounted garment hanger support, comprising a relatively long, one-piece, attaching angle having a horizontal leg and a vertical leg, said angle being carried by the door and having its horizontal leg in contact with the upper edge surface of the door, and between such surface and the adjacent surface of the door frame, and having its vertical leg adjacent to the inner surface of the door, whereby the garment hanger is prevented from tipping and is securely locked in place only when the door is closed, through the cooperation of the door, the door frame, and the door jamb, a horizontally arranged hanger rod secured at one end to, and extending-outwardly from, the vertical leg of the angle, and a vertically disposed supporting rod attached at its upper end to the other end of the horizontal hanger rod and having its lower end supported on the floor of the automobile.

KENNETH E. PLANTS.